Nov. 3, 1953
C. H. GARMAGER
2,657,534
TRACTOR HYDRAULIC SYSTEM
Filed Dec. 1, 1951
2 Sheets-Sheet 1
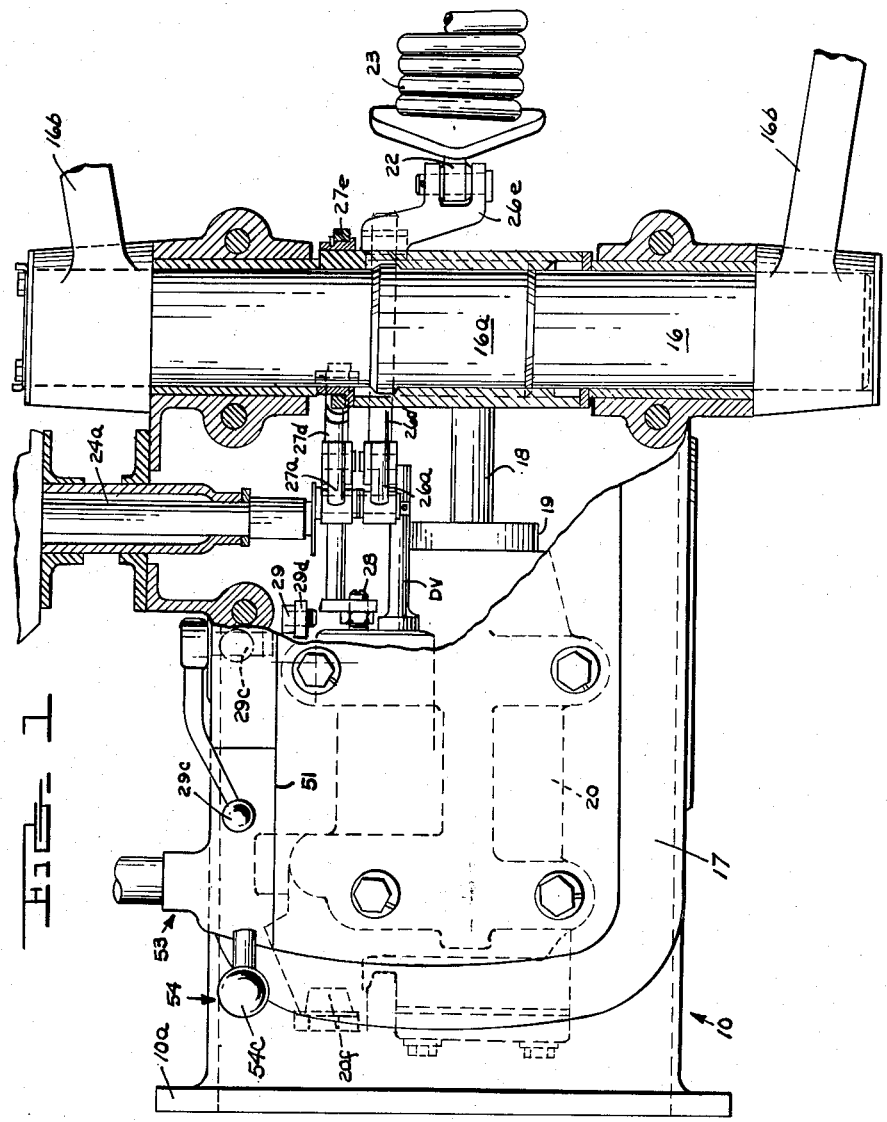
INVENTOR.
CURT H. GARMAGER
BY
ATTORNEY

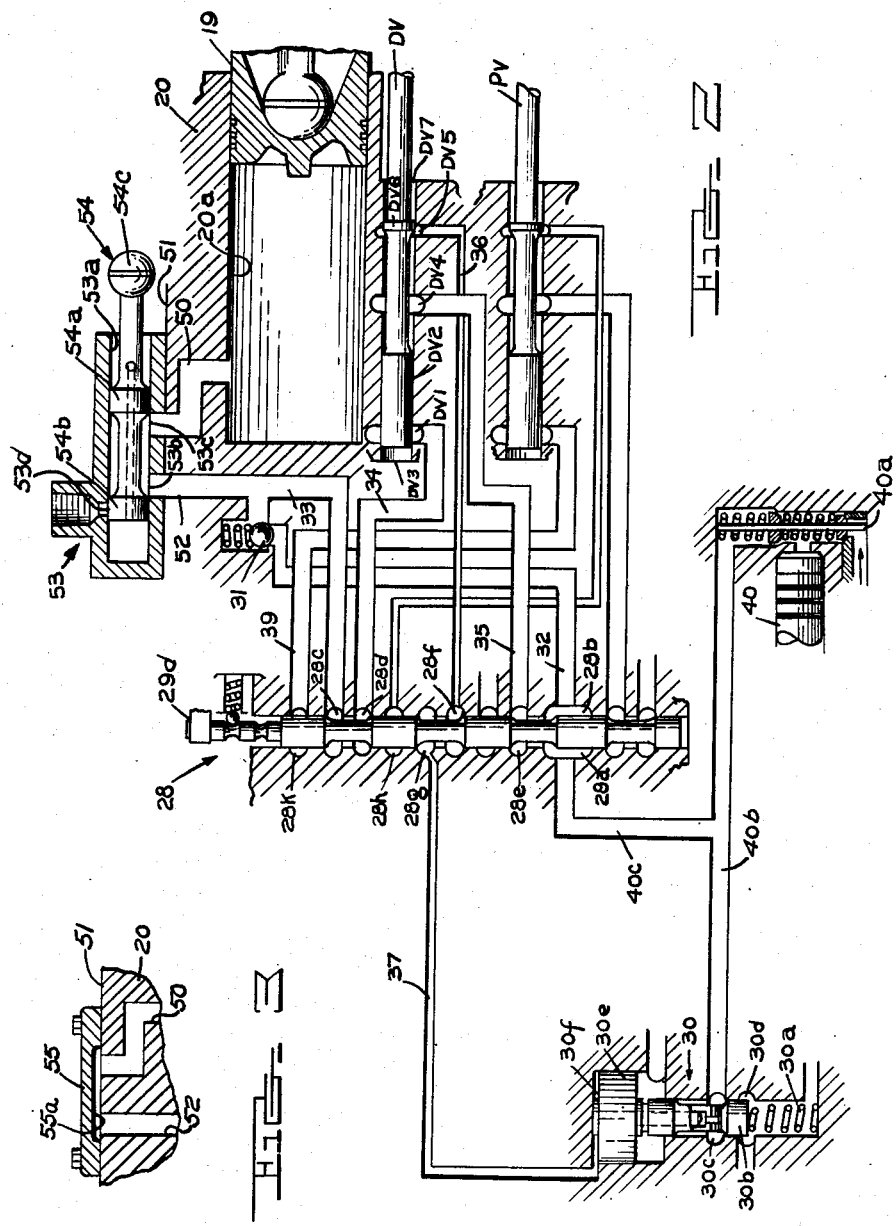

Patented Nov. 3, 1953

2,657,534

UNITED STATES PATENT OFFICE 2,657,534

TRACTOR HYDRAULIC SYSTEM

Curt H. Garmager, Royal Oak, Mich., assignor to Dearborn Motors Corporation, Birmingham, Mich., a corporation of Delaware Application December 1, 1951, Serial No. 259,432

2 Claims. (Cl. 60—52)

This invention relates to an improved valving device permitting a built-in tractor hydraulic system to be conveniently utilized for operation of additional hydraulic cylinders.

This application constitutes a continuation in part of my co-pending application, Serial Number 235,880, filed July 9, 1951. In such co-pending application, there is described and claimed an improved hydraulic arrangement for controlling the angular position of an hydraulically actuated implement lifting rock shaft on a tractor in response to a particular condition of operation of an implement connected to such rock shaft. As is well-known, the modern agricultural tractor is commonly called upon to perform a variety of duties in addition to operation of the common type of farm implements. For example, it has become common to mount material handling devices on such tractors, such as a manure loader, which incorporate one or more hydraulic cylinders to provide the necessary lifting forces, also, the tractor may be utilized with trailed type implements, such as a plow, disc harrow, or various harvesting implements, on which one or more hydraulic cylinders are provided to effect a certain adjustment of the trailed implement.

It is accordingly necessary that any so-called "built-in" hydraulic system on a tractor be capable of convenient modification to operate one or more additional hydraulic cylinders. Heretofore, this has been accomplished by establishing a fluid connection with the high pressure line of the tractor hydraulic system and then immobilizing the hydraulic ram normally operated by such hydraulic system so that the pressured fluid can be utilized to operate one or more additional hydraulic cylinders. For example, see the disclosure of the co-pending application of Donald Anderson, Serial Number 212,395, filed February 23, 1951 and assigned to the assignee of this application.

Accordingly, it is an object of this invention to provide a simple economical arrangement permitting a built-in tractor hydraulic system to be employed for the operation of additional hydraulic cylinders.

A particular object of this invention is to provide a valving arrangement on a tractor, at a position conveniently operable by the tractor operator, which will selectively function to cause the built-in tractor hydraulic system to either control the customary implement lifting ram provided on the tractor or to control one or more additional cylinders provided elsewhere on the tractor or on a connected implement.

The specific nature of this invention, as well as other objects and advantages thereof, will become apparent to those skilled in the art from the following detailed description taken in conjunction with the attached drawings on which, by way of preferred example only, is illustrated one embodiment of this invention.

On the drawings:

Figure 1 is a plan view, partly in section, of the rear end portion of the well-known Ford tractor which has been modified to incorporate the valving arrangement of this invention;

Figure 2 is a schematic representation of the hydraulic circuit of a built-in tractor hydraulic mechanism, illustrating the manner of connection thereto of the valving arrangement embodying this invention; and Figure 3 is a partial sectional view illustrating the manner of sealing the exposed ports when the valving arrangement embodying this invention is not assembled to the tractor.

As shown on the drawings:

As is more fully described in my above referred to co-pending application, a tractor hydraulic unit may be conveniently mounted on a cover housing 17 which is in turn mounted on top of a suitable opening provided in the rear end of the central body housing 10 of the well-known Ford tractor. On the bottom of cover housing 17 there is mounted a casting 20 defining a main cylinder 20a and a ram piston 19, the piston 19 being suitably connected to a transverse implement lifting rock shaft 16 which has a pair of conventional lifting crank arms 16b mounted on its respective extremities. Additionally, as is completely described in my co-pending application, a plurality of hydraulic control elements such as the draft control valve DV and position control valve PV are mounted in the casting 20 and the cover housing 17. The entire hydraulic circuit is schematically indicated in Figure 2 to which similar numerals have been applied to correspond with Figure 4 of my co-pending application. The control of the displacement of ram piston 19 by such hydraulic mechanism is accomplished in identical manner as described in my co-pending application, hence a detailed description thereof will not be repeated.

In accordance with this invention, the main cylinder 20a is no longer connected by direct conduit to the out-put side of check valve 31 but, instead, a conduit 50 is provided from main cylinder 20a which terminates in an exposed lateral face 51 (Figure 1) of the cover housing 17. Additionally, a conduit 52 connects the discharge side of check valve 31 with the same exposed face 51 of cover housing 17. A control valve unit 53 is suitably mounted in abutting, sealed relationship to the lateral face 51 and such housing defines a longitudinal valve bore 53a having a pair of radial ports 53b and 53c respectively disposed to communicate with the conduits 50 and 52. Within valve bore 53a a control valve piston 54 is slidably mounted having longitudinally spaced piston portions 54a and 54b which, in the position of the piston illustrated in Figure 2, are spaced so as to provide free communication between the ports 53b and 53c. Hence, in the illustrated position of the control valve 54, the main cylinder 20a is connected directly to the discharge side of check valve 31 and fluid is supplied to and/or removed from main cylinder 20a in exactly the same manner as described in detail in my co-pending application.

Additionally, valve housing 53 is provided with a radially disposed remote cylinder port 53d which, in the position of control valve 54 shown in Figure 2, is closed by piston portion 54b. Upon manual shifting of the control valve 54 to the left, as viewed in Figure 2, the piston portion 54b will interrupt the fluid connection between the conduits 50 and 52 and will place conduit 52 in direct communication with remote cylinder port 53d. Hence, the hydraulic system will then function to supply fluid to and/or withdraw fluid from one or more remote cylinders (not shown) that may be conveniently connected to remote cylinder port 53. At the same time, the main cylinder 20a is isolated from the hydraulic mechanism and the ram piston 19 is thereby effectively immobilized.

To control the selective positioning of control valve 54, one end of such control valve is permitted to project out of the valve housing 53 and terminate in a knob 54c. Since the cover housing 17 is normally located beneath the operator's seat, the control knob 54c will then be located in a position where it can be conveniently manipulated by the hand of the operator.

With the described arrangement, the tractor operator can instantly and conveniently utilize the hydraulic control system of the tractor to control either the ram piston 19 or one or more remote cylinders connected to remote cylinder port 53. Note particularly that there is no need for mechanically immobilizing the implement lifting rock shaft of the tractor inasmuch as the tractor ram 19 is completely isolated from the hydraulic system when it is utilized for operating remote cylinders. Of course, if it is desired to remove the valve housing 53 on the tractor, such housing may be replaced by a simple plate 55 (Figure 3) having a groove 55a formed in its surface so as to provide communication between the ports 50 and 52.

It will, of course, be understood that many details of construction may be varied through a wide range without departing from the principles of this invention and it is, therefore, not the purpose to limit the patent granted hereon otherwise than necessitated by the scope of the appended claims.

I claim:

1. An hydraulic control mechanism for tractors having a sump defining housing, an engine driven pump and an hydraulic ram, comprising a cover casting for said sump, valve means in said cover casting for controlling the application of pressured fluid to said ram including a check valve, a first conduit communicating between the discharge side of said check valve and an exposed face of said cover casting, a second conduit communicating between said hydraulic ram and said exposed face, a valve housing attachable to said exposed face, said valve housing having a pair of ports respectively alignable with said first and second conduits and a remote cylinder connection port, and a manually operable valve shiftably mounted in said valve housing, said valve being constructed and arranged to selectively connect said first conduit with either said second conduit or said remote cylinder connection port.

2. An hydraulic control mechanism for tractors having a sump defining housing, an engine driven pump and an hydraulic ram, comprising a cover casting for said sump, valve means in said cover casting for controlling the application of pressured fluid to said ram including a fluid supply conduit terminating in an exposed face of said cover casting, a ram conduit communicating between said hydraulic ram and said exposed face, a valve housing attachable to said exposed face, said valve housing having a pair of ports respectively alignable with said first and second conduits and a remote cylinder connection port, and a manually operable valve shiftably mounted in said valve housing, said valve being constructed and arranged to selectively connect said first conduit with either said second conduit or said remote cylinder connection port.

CURT H. GARMAGER.

References Cited in the file of this patent

UNITED STATES PATENTS

| Number | Name | Date |
|---|---|---|
| 690,611 | Roake | Jan. 7, 1902 |
| 861,805 | Camp | July 30, 1907 |
| 1,937,077 | West | Nov. 28, 1933 |
| 2,278,656 | Jeffrey | Apr. 7, 1942 |
| 2,575,507 | Acton | Nov. 20, 1951 |
| 2,582,896 | Acton | Jan. 15, 1952 |